US012807836B2

(12) United States Patent
Tanigawa

(10) Patent No.: US 12,807,836 B2
(45) Date of Patent: Nov. 24, 2026

(54) POLYURETHANE UREA WATER DISPERSION, MATTE COATING MATERIAL, AND SURFACE TREATMENT AGENT

(71) Applicant: DAINICHISEIKA COLOR & CHEMICALS MFG. CO., LTD., Chuo-ku (JP)

(72) Inventor: Masashi Tanigawa, Kita-ku (JP)

(73) Assignee: DAINICHISEIKA COLOR & CHEMICALS MFG. CO., LTD., Chuo-ku (JP)

( * ) Notice: Subject to any disclaimer, the term of this patent is extended or adjusted under 35 U.S.C. 154(b) by 911 days.

(21) Appl. No.: 17/414,225

(22) PCT Filed: Dec. 12, 2019

(86) PCT No.: PCT/JP2019/048728
§ 371 (c)(1),
(2) Date: Jun. 15, 2021

(87) PCT Pub. No.: WO2020/129811
PCT Pub. Date: Jun. 25, 2020

(65) Prior Publication Data

US 2022/0041888 A1 Feb. 10, 2022

(30) Foreign Application Priority Data

Dec. 19, 2018 (JP) ................................ 2018-237421

(51) Int. Cl.

| | |
|---|---|
| ***C09D 175/12*** | (2006.01) |
| ***B32B 27/00*** | (2006.01) |
| ***C08G 18/00*** | (2006.01) |
| ***C08G 18/08*** | (2006.01) |
| ***C08G 18/12*** | (2006.01) |
| ***C08G 18/32*** | (2006.01) |
| ***C08G 18/34*** | (2006.01) |
| ***C08G 18/40*** | (2006.01) |
| ***C08G 18/42*** | (2006.01) |
| ***C08G 18/44*** | (2006.01) |
| ***C08G 18/48*** | (2006.01) |
| ***C08G 18/61*** | (2006.01) |
| ***C08G 18/62*** | (2006.01) |
| ***C08G 18/65*** | (2006.01) |
| ***C08G 18/66*** | (2006.01) |
| ***C08G 18/73*** | (2006.01) |
| ***C09D 5/02*** | (2006.01) |
| ***C09D 175/02*** | (2006.01) |
| ***C09D 175/06*** | (2006.01) |

(52) U.S. Cl.
CPC ............ *C09D 175/12* (2013.01); *B32B 27/00* (2013.01); *C08G 18/00* (2013.01); *C08G 18/0852* (2013.01); *C08G 18/12* (2013.01); *C08G 18/3206* (2013.01); *C08G 18/3228* (2013.01); *C08G 18/348* (2013.01); *C08G 18/4009* (2013.01); *C08G 18/42* (2013.01); *C08G 18/44* (2013.01); *C08G 18/48* (2013.01); *C08G 18/61* (2013.01); *C08G 18/6204* (2013.01); *C08G 18/6225* (2013.01); *C08G 18/65* (2013.01); *C08G 18/6659* (2013.01); *C08G 18/73* (2013.01); *C09D 5/02* (2013.01); *C09D 175/02* (2013.01); *C09D 175/06* (2013.01)

(58) Field of Classification Search
CPC ...... C09D 175/12; C09D 5/02; C09D 175/02; C09D 175/06; C08G 18/12; C08G 18/3206; C08G 18/348; C08G 18/4009; C08G 18/44; C08G 18/61; C08G 18/6659; C08G 18/73; C08G 18/0852; C08G 18/3228; C08G 18/00; C08G 18/65; C08G 18/42; C08G 18/48; C08G 18/6204; C08G 18/6225; B32B 27/00
See application file for complete search history.

(56) References Cited

U.S. PATENT DOCUMENTS 3,243,475 A 3/1966 Reischl et al.
7,276,554 B2 * 10/2007 Rische .................... C09D 5/00 524/591
2002/0155079 A1 10/2002 Kim et al.
(Continued)

FOREIGN PATENT DOCUMENTS

CN 1735642 A 2/2006
EP 1 354 902 A1 10/2003
(Continued)

OTHER PUBLICATIONS

International Search Report issued on Feb. 10, 2020 in PCT/JP2019/048728 filed on Dec. 12, 2019, 3 pages.
(Continued)

*Primary Examiner* — Rabon A Sergent
(74) *Attorney, Agent, or Firm* — Oblon, McClelland, Maier & Neustadt, L.L.P.

(57) ABSTRACT

A polyurethane urea water dispersion that is a reaction product of a polyol component containing a polymer polyol (A), a polysiloxane compound(S) having at least one active hydrogen-containing group, a compound (B) having at least one active hydrogen and a hydrophilic group in a molecule thereof, and a dihydric alcohol (C); a polyisocyanate (D); and a polyamine (E) having two primary amino groups and at least one secondary amino group, wherein the polyurethane urea water dispersion has an acid value of 1 to 16 mgKOH/g as expressed in terms of a solid component.

20 Claims, No Drawings

(56) References Cited

U.S. PATENT DOCUMENTS

| | | | |
|---|---|---|---|
| 2012/0001980 A1 | 1/2012 | Ichinose et al. |
| 2018/0002476 A1 | 1/2018 | Reuter et al. |
| 2019/0071534 A1 | 3/2019 | Hattori et al. |

FOREIGN PATENT DOCUMENTS

| | | | | |
|---|---|---|---|---|
| EP | 1 904 556 | A2 | | 4/2008 |
| EP | 2 690 117 | A1 | | 1/2014 |
| JP | 5-25239 | A | | 2/1993 |
| JP | 2000-336141 | A | | 12/2000 |
| JP | 2005-68228 | A | | 3/2005 |
| JP | 2007-92195 | A | * | 4/2007 |
| JP | 2007-119749 | A | | 5/2007 |
| JP | 2007-308587 | A | | 11/2007 |
| JP | 2013-67793 | A | | 4/2013 |
| JP | 2017-186691 | A | | 10/2017 |
| JP | 2019-11408 | A | | 1/2019 |
| KR | 10-2008-0026150 | a | | 3/2008 |
| KR | 10-2010-0018175 | A | | 2/2010 |
| KR | 10-2017-0092655 | A | | 8/2017 |
| WO | WO 2007/003264 | A2 | | 1/2007 |

OTHER PUBLICATIONS

Office Action issued May 15, 2023, in corresponding Korean Patent Application No. 10-2021-7018251, 3 pages.

Extended European Search Report issued Jul. 22, 2022 in European Patent Application No. 19900832.7, 7 pages.

Combined Chinese Office Action and Search Report issued Nov. 12, 2021 in Patent Application No. 201980084522.5 (with English translation of Category of Cited Documents), received on Dec. 21, 2021, 10 pages.

Combined Chinese Office Action and Search Report issued Jun. 7, 2022 in Chinese Patent Application No. 2019/0084522.5, 10 pages.

* cited by examiner

POLYURETHANE UREA WATER DISPERSION, MATTE COATING MATERIAL, AND SURFACE TREATMENT AGENT

CROSS-REFERENCE TO RELATED APPLICATIONS

The present application is the national stage of international application PCT/JP2019/048728, filed on Dec. 12, 2019, and claims the benefit of the filing date of Japanese Appl. No. 2018-237421, filed on Dec. 19, 2018, the content of each of which is incorporated by reference.

TECHNICAL FIELD

The present invention relates to a polyurethane urea water dispersion, a matte coating agent, and a surface treatment agent.

BACKGROUND ART

Conventionally, coating with a paint is applied to building exteriors, building interiors, vehicle interiors, and so on for the purpose of improvement of beautifulness and protection. In particular, in the case of suppressing gloss and luster and creating an appearance with a mellow texture, matte coating agents are frequently used. In recent years, from the standpoint of the environmental issue and safety, conversion to an aqueous paint in which the use of an organic solvent is suppressed to the utmost is attempted, and there is an increasing demand for aqueous matte coating agents.

For matte coating agents, hydrophobic silica, resin beads, and the like are typically used as a matting agent. As for such matte coating agents, there is a concern that the matting agent bleeds out onto the coating film, or the matting agent or the coating film peels off owing to friction. As a result, there is a problem that weather resistance, stain resistance, matte performance, and the like are deteriorated. In order to solve this problem, an aqueous paint capable of imparting matting properties to the coating film even without blending a matting agent has been developed. For example, PTL 1 discloses a resin composition for aqueous matte coating agent in which matting properties are imparted through joint use of urethane crosslinked particles having an average particle diameter different from each other.

CITATION LIST

Patent Literature

PTL 1: JP 2007-308587 A

SUMMARY OF INVENTION

Technical Problem

However, in the resin composition for matte coating agent disclosed in PTL 1, the weather resistance or heat resistance is expected to be lowered because of necessity for use of a surfactant. Furthermore, in view of the fact that the hard segment is not sufficiently introduced, and crosslinked particles with a high degree of crosslinking are used, there may be caused a problem that the particles peel off from the coating film, resulting in a lowering in scratch resistance. In addition to that, in order to obtain high matting properties, the urethane particles alone are insufficient, and it is necessary to add a matting agent separately.

Furthermore, matte coating agents are considered to be required to have good storage stability, soft feel properties, slipperiness, and coating appearance, for example. However, conventional matte coating agents may not be excellent in all of them.

In particular, skin materials to be used for instrument panels, door trims, ceilings, seats, and so on of automobiles are liable to cause problems of rubbing against people, parts, or other skin materials, causing an abnormal noise, such as a creaking noise, and peeling of coating film. For that reason, if such problems can be prevented or reduced by imparting slipperiness to the skin material to reduce friction, an improvement in durability is brought.

In view of the foregoing circumstances, the present invention has been made, and a problem of the present invention is to provide a polyurethane urea water dispersion capable of making matting properties, heat resistance, scratch resistance, storage stability, coating appearance, slipperiness, and soft feel properties favorable, a matte coating agent, and a surface treatment agent.

Solution to Problem

The present inventor and others made extensive and intensive investigations. As a result, it has been found that by constituting the polyurethane urea water dispersion of a specified compound, the aforementioned problem can be solved, thereby leading to accomplishment of the following present invention. Specifically, the present invention provides the following [1] to [15].

[1] A polyurethane urea water dispersion that is a reaction product of a polyol component containing a polymer polyol (A), a polysiloxane compound (S) having at least one active hydrogen-containing group, a compound (B) having at least one active hydrogen and a hydrophilic group in a molecule thereof, and a dihydric alcohol (C); a polyisocyanate (D); and a polyamine (E) having two primary amino groups and at least one secondary amino group, wherein the polyurethane urea water dispersion has an acid value of 1 to 16 mgKOH/g as expressed in terms of a solid component.

[2] The polyurethane urea water dispersion as set forth in [1], which is a reaction product obtained by further reacting an NCO group-containing urethane prepolymer composed of a reaction product of the polyol component and a polyisocyanate (D), with a polyamine (E).

[3] The polyurethane urea water dispersion as set forth in [2], wherein the NCO group-containing urethane prepolymer is a reaction product obtained by reacting the polyol component and the polyisocyanate (D) in a ratio (NCO/active hydrogen) of the NCO group of the polyisocyanate (D) to the active hydrogen of the polyol component of 1.1 to 5, and the NCO group-containing urethane prepolymer is reacted with the polyamine (E) in a ratio (NH/NCO) of a sum of the primary amino group and the secondary amino group of the polyamine (E) to the NCO group of the NCO group-containing urethane prepolymer of 0.3 to 2.1.

[4] The polyurethane urea water dispersion as set forth in any of [1] to [3], wherein a mass ratio (S/A) of the polysiloxane compound (S) having at least one active hydrogen-containing group to the polymer polyol (A) is 0.01 to 30.

[5] The polyurethane urea water dispersion as set forth in any of [1] to [4], wherein a molar ratio (B/A) of the compound (B) to the polymer polyol (A) is 0.05 to 0.9, and a molar ratio (C/A) of the dihydric alcohol (C) to the polymer polyol (A) is 0.4 to 2.

[6] The polyurethane urea water dispersion as set forth in any of [1] to [5], wherein the polyol component further contains a trihydric or higher hydric alcohol (T).

[7] The polyurethane urea water dispersion as set forth in [6], wherein a molar ratio ([C+T]/A) of a sum of the dihydric alcohol (C) and the trihydric or higher hydric alcohol (T) to the polymer polyol (A) is 0.4 to 3.0.

[8] The polyurethane urea water dispersion as set forth in [6], wherein a molar ratio ([C+T]/A) of a sum of the dihydric alcohol (C) and the trihydric or higher hydric alcohol (T) to the polymer polyol (A) is 0.6 to 2.0.

[9] The polyurethane urea water dispersion as set forth in any of [6] to [8], wherein a molar ratio (T/C) of the trihydric or higher hydric alcohol (T) to the dihydric alcohol (C) is 0.01 to 2.0.

[10] The polyurethane urea water dispersion as set forth in any of [1] to [9], wherein an average particle diameter thereof is 0.03 to 15 μm.

[11] The polyurethane urea water dispersion as set forth in any of [1] to [10], wherein a number average molecular weight of the dihydric alcohol (C) is less than 500.

[12] The polyurethane urea water dispersion as set forth in any of [1] to [11], wherein the polyamine (E) is at least one selected from the group consisting of diethylenetriamine, dipropylenetriamine, triethylenetetramine, tetraethylenepentamine, and 2-aminoethyl-3-aminopropylamine.

[13] The polyurethane urea water dispersion as set forth in any of [1] to [12], wherein the polymer polyol (A) is a polycarbonate polyol.

[14] A matte coating agent containing the polyurethane urea water dispersion as set forth in any of [1] to [13].

[15] A surface treatment agent containing the polyurethane urea water dispersion as set forth in any of [1] to [13].

Advantageous Effects of Invention

In accordance with the present invention, it is possible to provide a polyurethane urea water dispersion capable of making matting properties, heat resistance, scratch resistance, storage stability, coating appearance, slipperiness, and soft feel properties favorable; a matte coating agent; and a surface treatment agent.

DESCRIPTION OF EMBODIMENTS

[Polyurethane Urea Water Dispersion]

The polyurethane urea water dispersion of the present invention is a reaction product of a polyol component containing a polymer polyol (A), a polysiloxane compound (S) having at least one active hydrogen-containing group, a compound (B) having at least one active hydrogen and a hydrophilic group in a molecule thereof, and a dihydric alcohol (C); a polyisocyanate (D); and a polyamine (E) having two primary amino groups and at least one secondary amino group, wherein the polyurethane urea water dispersion has an acid value of 1 to 16 mgKOH/g as expressed in terms of a solid component.

From the viewpoint of obtaining more favorable heat resistance, it is preferred that a trihydric or higher hydric alcohol (T) is contained in the polyol component.

In the present invention, by using the dihydric alcohol (C) in addition to the polymer polyol (A), a soft segment and a hard segment exist in the polyurethane urea. In addition, by using the polyamine (E) together with the dihydric alcohol (C), the polyurethane urea is moderately crosslinked, and a crosslinked moiety and a non-crosslinked moiety coexist in the polyurethane urea. In the coating film, it is presumed that the crosslinked moiety exhibits a behavior as a matting agent (particle), and the non-crosslinked moiety exhibits a behavior as a binder. In addition, in view of the fact that the polysiloxane compound (S) having at least one active hydrogen-containing group is contained, siloxane modification is caused, and the slipperiness is improved. Furthermore, by using the compound (B), it is possible to impart water dispersibility to the polyurethane urea. In addition, by controlling the acid value expressed in terms of a solid component to the aforementioned range, matting properties are obtained by regulating the particle diameter while keeping the water dispersibility of the polyurethane urea.

In the light of the above, in the polyurethane urea water dispersion, not only the storage stability is favorable even without using a surfactant, but also it is possible to provide high matting properties even without using a matting agent. Furthermore, it is possible to make the heat resistance, the coating appearance, the soft feel properties, the slipperiness, the scratch resistance, and so on favorable.

Each of the components to be used in the present invention is hereunder described in detail.

(Polymer Polyol (A))

Although a number average molecular weight of the polymer polyol (A) may be 500 or more, it is preferably 500 to 4,000, and more preferably 1,000 to 3,000. In the present invention, by using the polymer polyol (A) having a relatively high molecular weight together with a dihydric alcohol (C) as mentioned later, it becomes easy to appropriately form both a soft segment and a hard segment in the polyurethane urea, and it becomes easy to make the various performances of the polyurethane urea water dispersion favorable.

Although the polymer polyol (A) may be a polyol having at least two hydroxy groups in one molecule, it is preferably a diol having two hydroxy groups.

The number average molecular weight of the polymer polyol (A) means a number average molecular weight expressed in terms of standard polystyrene, as measured by the gel permeation chromatography (GPC). Specifically, the measurement is performed through a GPC analysis using THF as a mobile phase (device: "GPC-8020", manufactured by Tosoh Corporation; column: Super AW2500+AW3000+AW4000+AW5000; hereinafter also the same in the section of Examples).

As for the polymer polyol (A), raw materials which are used for usual production of polyurethane, such as a polyether polyol, a polyester polyol, a polycarbonate polyol, a polyolefin polyol, and a polymethacrylate polyol, can be used.

Examples of the polyether polyol to be used for the polymer polyol (A) include ones obtained through polymerization or copolymerization of one or more selected from alkylene oxides, such as ethylene oxide, propylene oxide, and butylene oxide, and heterocyclic ethers, such as tetrahydrofuran. The copolymer may be any of a block copolymer and a random copolymer. More specifically, examples thereof include polyethylene glycol, polypropylene glycol, block or random polyethylene glycol-polytetramethylene glycol, polytetramethylene ether glycol, and polyhexamethylene glycol.

Examples of the polyester polyol include ones obtained through condensation polymerization of one or more selected from aliphatic dicarboxylic acids, such as succinic acid, adipic acid, sebacic acid, glutaric acid, and azelaic acid, and aromatic dicarboxylic acids, such as isophthalic acid and terephthalic acid, and low-molecular weight glycols, such as ethylene glycol, 1,2-propylene glycol, 1,3-propylene glycol, 1,3-butylene glycol, 1,4-bisbutylene glycol, 1,6-hexamethylene glycol, neopentyl glycol, and 1,4-bishydroxymethylcyclohexane. Specifically, examples of the polyester polyol include polyethylene adipate diol, polybutylene adipate diol, polyhexamethylene adipate diol, polyneopentyl adipate diol, polyethylene/butylene adipate diol, polyneopentyl/hexyl adipate diol, poly-3-methylpentane adipate diol, and polybutylene isophthalate diol.

As for the polyester polyol, a polylactone polyol can also be used. Examples of the polylactone polyol include polycaprolactone diol and poly-3-methylvalerolactone diol.

Examples of the polycarbonate diol include polyhexamethylene carbonate diol and polytetramethylene carbonate diol, and besides, a copolymerized polycarbonate diol, such as a polycarbonate diol obtained from 1,3-propanediol and 1,4-butanediol and a polycarbonate diol obtained from 1,5-pentanediol and 1,6-hexanediol.

Examples of the polyolefin polyol include polybutadiene glycol and polyisoprene glycol, or a hydride thereof.

Examples of the polymethacrylate diol include α,ω-polymethyl methacrylate diol and α,ω-polybutyl methacrylate diol.

Among those mentioned above, a polycarbonate polyol is preferred. By using the polycarbonate polyol, the solvent resistance and the heat resistance of the coating film of the polyurethane urea become favorable.

Although the polymer polyol (A) may be used alone, it may also be used in combination of two or more thereof.

(Polysiloxane Compound (S) Having at Least One Active Hydrogen-Containing Group)

The polysiloxane compound (S) having at least one active hydrogen-containing group (hereinafter sometimes referred to as "polysiloxane compound (S)") undergoes polysiloxane modification of the polyurethane urea in the polyurethane urea water dispersion of the present invention. By undergoing the polysiloxane modification, the slipperiness is improved, and on the occasion of being formed in a surface treatment agent or the occasion of preparing a single film, the scratch resistance and the stain resistance are expected to be improved, too. Examples of the polysiloxane compound to be used for the polysiloxane modification include compounds, such as an amino-modified polysiloxane, an epoxy-modified polysiloxane, an alcohol-modified polysiloxane, and a mercapto-modified polysiloxane.

As for the polysiloxane compound, more specifically, compounds having structures of (1) to (4) mentioned below can be used.

(1) Amino-Modified Polysiloxane

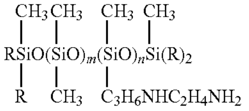

(m = 1 to 10, n = 2 to 10, R = $CH_3$ or $OCH_3$)

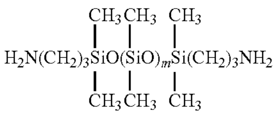

(m = 0 to 200)

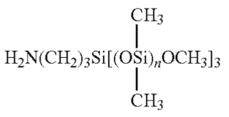

(n = 2 to 10)

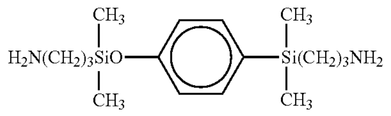

-continued

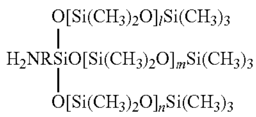

(Branching point = 2 to 3, R = lower alkyl group, 1 = 2 to 200, m = 2 to 200, n = 2 to 200)

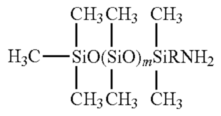

(m = 1 to 200, R = lower alkyl group)

(2) Epoxy-Modified Polysiloxane

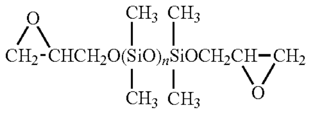

(n = 1 to 200)

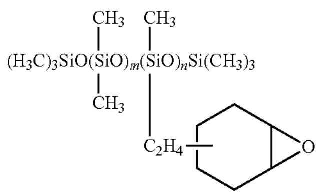

(m = 1 to 10, n = 2 to 10)

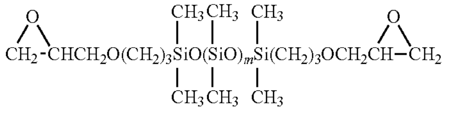

(m = 1 to 200)

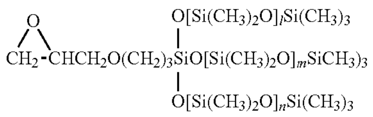

(Branching point = 2 to 3, 1 = 2 to 200, m = 2 to 200, n = 2 to 200)

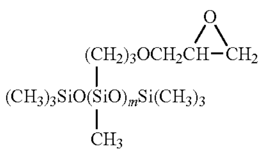

(m = 1 to 10)

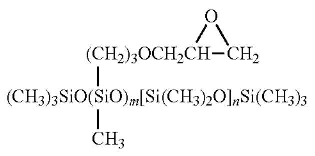

(m = 1 to 10, n = 2 to 10)

(3) Alcohol-Modified Polysiloxane

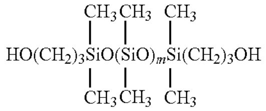

(m = 1 to 300)

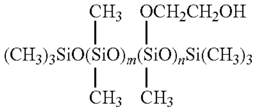

(m = 1 to 300, n = 2 to 50)

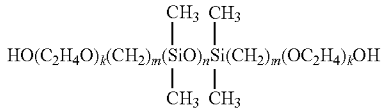

(k = 1 to 200, m = 2 to 6, n = 1 to 400)

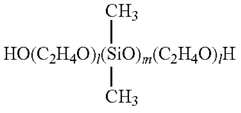

(l = 1 to 200, m = 1 to 200)

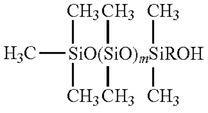

(m = 1 to 400, R = lower alkyl group)

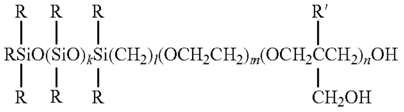

(R = $CH_3$ or $OCH_3$, R′ = hydrogen atom or alkyl group, k = 1 to 250, l = 0 to 5, m = 0 to 50, n = 1 to 3))

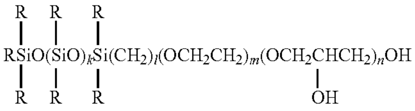

(R = $CH_3$ or $OCH_3$, k = 1 to 250, l = 0 to 5, m = 0 to 50, n = 1 to 3)

[4] Mercapto-Modified Polysiloxane

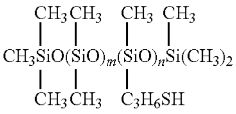

(m = 1 to 20, n = 2 to 100)

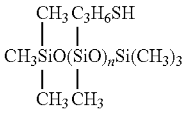

(n = 2 to 100)

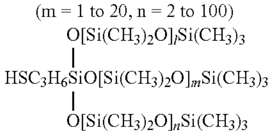

(Branching point = 2 to 3, l = 2 to 200, m = 2 to 200, n = 2 to 200)

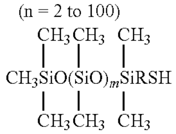

(m = 1 to 300, R = lower alkyl group)

The aforementioned polysiloxane compounds (1) to (4) are an example of a preferred compound, and it should be construed that the polysiloxane compound is not limited to these exemplified compounds. In addition, among the aforementioned compounds, the alcohol-modified polysiloxane is preferred.

Although the aforementioned exemplified compounds are a preferred compound to be used in the present invention, it should be construed that the polysiloxane is not limited to these exemplified compounds. In consequence, not only the above-exemplified compounds but also other compounds which are currently commercially available and can be easily obtained from the market can be used in the present invention.

In addition to these compounds, for example, a polylactone (polyester)-polysiloxane obtained by modifying a polysiloxane with a lactone and a polyalkylene oxide-polysiloxane modified with an alkylene oxide are also preferably used. Preferred examples of the lactone which is used herein include β-propiolactone, γ-butyrolactone, δ-valerolactone, ε-caprolactone, 7-heptanolide, 8-octanolide, γ-valerolactone, γ-caprolactone, and δ-caprolactone.

Examples of the alkylene oxide include ethylene oxide, propylene oxide, α-butylene oxide, β-butylene oxide, hexene oxide, cyclohexene oxide, styrene oxide, and α-methylstyrene oxide.

From the viewpoint of obtaining dispersibility and more sufficient slipperiness of the polyurethane urea water dispersion, a mass ratio (S/A) of the polysiloxane compound (S) having at least one active hydrogen-containing group to the polymer polyol (A) is preferably 0.01 to 30, and more preferably 0.02 to 2.00.

(Compound (B))

As for the compound (B) having at least one active hydrogen and a hydrophilic group in a molecule thereof, which is used in the present invention, a known compound which is used as a component capable of imparting water dispersibility of the polyurethane water dispersion can be used.

In the compound (B), the active hydrogen refers to a hydrogen atom capable of reacting with an isocyanate group of the polyisocyanate (D). Examples thereof include hydrogen atoms of a hydroxy group, a mercapto group, an amino group, and the like, and of these, a hydrogen atom of a hydroxy group is preferred. In addition, the hydrophilic group is a functional group in order to impart water dispersibility. Although the hydrophilic group may be either anionic or cationic, it is preferably anionic. Examples of the anionic hydrophilic group include a carboxy group, a sulfo group, and a phosphate group, and of these, a carboxy group is preferred.

In the blending calculation of the present invention, the hydrophilic group of the compound (B) is not included in the active hydrogen group.

As for the compound (B) in which the hydrophilic group is anionic, ones having, for example, a sulfonic acid-based hydrophilic group, a carboxylic acid-based hydrophilic group, or a phosphoric acid-based hydrophilic group can be used. Examples thereof include carboxylic acid compounds, such as dimethylolpropionic acid, dimethylolbutanoic acid, lactic acid, and glycine, and sulfonic acid compounds, such as taurine and a sulfoisophthalic acid-based polyester ilia Of these, a carboxylic acid compound of a dihydric alcohol, especially a dimethylolalkanoic acid, such as dimethylolpropionic acid and dimethylolbutanoic acid, can be preferably used.

By neutralizing the hydrophilic group with a neutralizing agent to form a salt, it is possible to disperse the polyurethane urea in water in the form of fine particles. Examples of the neutralizing agent for the anionic hydrophilic group include organic amines, such as alkylamines, e.g., ethylamine, trimethylamine, triethylamine, triisopropylamine, and tributylamine, and alkanolamines, e.g., triethanolamine, N-methyldiethanolamine, N-phenyldiethanolamine, monoethanolamine, dimethylethanolamine, diethylethanolamine, and 2-amino-2-ethyl-1-propanol; and alkali metal hydroxides, such as lithium hydroxide, sodium hydroxide, and potassium hydroxide. Of these, tertiary alkylamines, such as triethylamine, sodium hydroxide, and tertiary alkanolamines, such as dimethylaminoethanol are preferred.

(Dihydric Alcohol (C))

The dihydric alcohol (C) is a low-molecular weight dihydric alcohol, and specifically, it is a dihydric alcohol having a number average molecular weight of less than 500. By controlling the number average molecular weight of the dihydric alcohol (C) to less than 500, the hard segment is readily introduced into the polyurethane urea, the heat resistance becomes favorable, and faults, such as a lowering of matting properties in the high-temperature environment, hardly occur. In addition, when the dihydric alcohol (C) is used, in the polyurethane urea, in view of the fact that the dihydric alcohol moiety does not become the crosslinked moiety but becomes the non-crosslinked moiety, it is presumed that the crosslinked moiety and the non-crosslinked moiety moderately coexist, whereby various performances, such as matting properties, scratch resistance, and soft feel properties, are readily made favorable. From the aforementioned viewpoint, the number average molecular weight of the dihydric alcohol (C) is preferably 350 or less, and more preferably 200 or less. In addition, from the viewpoint of practicality, the number average molecular weight of the dihydric alcohol (C) is preferably 60 or more, and more preferably 85 or more. The number average molecular weight of the dihydric alcohol (C) is an arithmetic mean value of molecular weights calculated from formula weights.

Examples of the dihydric alcohol (C) include compounds, such as aliphatic glycols, e.g., ethylene glycol, 1,2-propylene glycol, 1,3-propylene glycol, 1,3-butylene glycol (1,3-butanediol), 1,4-butylene glycol (1,4-butanediol), 1,6-hexamethylene glycol, and neopentyl glycol, and alkylene oxide low molar adducts thereof (number average molecular weight: less than 500); alicyclic glycols, e.g., 1,4-bishydroxymethylcyclohexane and 2-methyl-1,1-cyclohexanedimethanol, and alkylene oxide low molar adducts thereof (number average molecular weight: less than 500); glycols having an aromatic ring, e.g., xylylene glycol, and alkylene oxide low molar adducts thereof (number average molecular weight: less than 500); bisphenols, e.g., bisphenol A, thiobisphenol, and sulfonebisphenol, and alkylene oxide low molar adducts thereof (number average molecular weight: less than 500); and alkyldialkanolamines, e.g., C1-C18 alkyldiethanolamines, These dihydric alcohols may be used alone or may be used in combination of two or more thereof. In addition, as for the dihydric alcohol, among those mentioned above, compounds having a low molecular weight are preferred, and above all, aliphatic glycols are more preferred. Specifically, ethylene glycol, 1,2-propylene glycol, 1,3-propylene glycol, 1,3-butylene glycol, and 1,4-butylene glycol are still more preferred. Of these, 1,4-butylene glycol is yet still more preferred from the viewpoint of dispersibility in the water dispersion.

(Trihydric or Higher Hydric Alcohol (T))

The trihydric or higher hydric alcohol (T) is a trihydric or higher hydric alcohol having a low molecular weight, and specifically, it is a trihydric or higher hydric alcohol having a number average molecular weight of 92 to 500, and preferably 92 to 300.

In the present invention, by using the trihydric or higher hydric alcohol (T), it is possible to introduce a crosslinking structure into the polyurethane urea. For that reason, the heat resistance becomes favorable, and for example, it is possible to keep a gloss favorable even after being heated at a high temperature.

Examples of the trihydric or higher hydric alcohol (T) include trihydric alcohols, such as glycerin, trimethylolpropane, butanetriol, pentanetriol, hexanetriol, cyclopentanetriol, and cyclohexanetriol; and trihydric or higher hydric alcohols, such as pentaerythritol, dipentaerythritol, and tetramethylolpropane.

The trihydric or higher hydric alcohol above may be used alone or may be used in combination of two or more thereof. In addition, as for the trihydric or higher hydric alcohol, among those mentioned above, trihydric alcohols are preferred, and specifically, glycerin and trimethylolpropane are more preferred.

(Polyisocyanate (D))

As for the polyisocyanate (D), known compounds can be used. For example, diisocyanates having an aromatic ring, such as 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanatodiphenyl ether, 4,4'-methylenebis(phenylene isocyanate) (MDI), durylene diisocyanate, tolylene diisocyanate (TDI), xylylene diisocyanate (XDI), 1,5-naphthalene diisocyanate, benzidine diisocyanate, 1,5-tetrahydronaphthalene diisocyanate, o-nitrobenzidine diisocyanate, and 4,4'-diisocyanate dibenzyl; aliphatic diisocyanates, such as methylene diisocyanate, 1,4-tetramethylene diisocyanate, 1,6-hexamethylene diisocyanate, and 1,10-decamethylene diisocyanate; alicyclic diisocyanates, such as 1,4-cyclohexylene diisocyanate, 1,3-bis(isocyanatomethyl)cyclohexane, isophorone diisocyanate, hydrogenated MDI, and hydrogenated XDI; and polyurethane prepolymers obtained by reacting such a diisocyanate compound and a low-molecular weight polyol or polyamine such that the ends thereof are an isocyanate, can be used. Examples of the low-molecular weight polyol or polyamine include ones having a molecular weight of less than 500.

There can also be exemplified dimers and trimers of these organic polyisocyanates; and modified products, such as a biuretized isocyanate. These organic polyisocyanates may be used alone or may be in combination of two or more thereof.

From the standpoint of weather resistance, one selected from aliphatic and alicyclic polyisocyanates is preferably used as the polyisocyanate (D). Specifically, 1,6-hexamethylene diisocyanate, 4,4'-dicyclohexylmethane diisocyanate, isophorone diisocyanate, 1,3-bis(isocyanatomethyl)cyclohexane, and so on are preferably used. Above all, 1,6-hexamethylene diisocyanate that is an aliphatic diisocyanate; and isophorone diisocyanate and 4,4'-dicyclohexylmethane diisocyanate that are an alicyclic isocyanate are preferred in view of the fact that high weather resistance is obtained.

(Polyamine (E))

The polyamine (E) to be used in the present invention is a compound having two primary amino groups and at least one secondary amino group. The number of the secondary amino group in the polyamine (E) is preferably 1 to 5, and more preferably 1 to 3.

In the present invention, by using the polyamine (E), it is possible to introduce a crosslinking structure into the polyurethane urea. For that reason, the heat resistance becomes favorable, and for example, it is possible to keep a gloss favorable even after being heated at a high temperature.

Specifically, as for the polyamine (E), diethylenetriamine, dipropylenetriamine, triethylenetetramine, tetraethylenepentamine, 2-aminoethyl-3-aminopropylamine, and so on can be used. Of these, diethylenetriamine and triethylenetetramine are preferred, and diethylenetriamine is more preferred.

The polyamine (E) may be used alone or may be used in combination of two or more thereof.

In addition to the polyamine (E), a diamine may be jointly used within a range where the effects of the present invention are not affected. Examples of the diamine include an aliphatic diamine, an alicyclic diamine, an aromatic diamine, and a hydrazine-based compound. Examples of the aliphatic diamine include a short-chain diamine having about 2 to 8 carbon atoms and a long-chain diamine, such as a polyalkylenediamine.

As for the diamine, from the viewpoint that a self-curing reaction type paint can be designed, a silane coupling agent of an amino-modified type, such as N-2-(aminoethyl)-3-aminopropylmethyldimethoxysilane, may be used.

These diamines can be used alone or in combination of two or more thereof.

More specifically, the polyurethane urea water dispersion of the present invention is a reaction product obtained by further reacting the NCO group-containing urethane prepolymer composed of a reaction product of the polyol component containing the polymer polyol (A), the polysiloxane compound (S), the compound (B), the dihydric alcohol (C), and the trihydric or higher hydric alcohol (T) to be mixed as needed, and the polyisocyanate (B) with the polyamine (E). In the present invention, the polymer polyol (A), the polysiloxane compound (S), the compound (B), and the dihydric alcohol (C), and the trihydric or higher hydric alcohol (T) to be mixed as needed, are collectively referred to as "polyol component".

In the polyol component, a molar ratio (B/A) of the compound (B) to the polymer polyol (A) is preferably 0.05 to 0.95, and more preferably 0.08 to 0.6. When the molar ratio (B/A) is the aforementioned lower limit value or more, the dispersibility of the polyurethane urea water dispersion readily becomes favorable. In addition, when the molar ratio (B/A) is the aforementioned upper limit value or less, the water resistance readily becomes favorable.

A molar ratio (C/A) of the dihydric alcohol (C) to the polymer polyol (A) is preferably 0.4 to 2, more preferably 0.6 to 1.5, and still more preferably 0.7 to 1.2. When the molar ratio (C/A) is the lower limit value or more, the amount of the hard segment in the polyurethane urea is moderately increased, and the performances, such as matting properties, are readily improved. In addition, when the molar ratio (C/A) is the aforementioned upper limit value or less, the amount of the soft segment in the polyurethane urea is appropriately controlled, whereby the performances, such as soft feel properties, scratch resistance, and coating appearance of the coating film, and storage stability of the paint, are readily made favorable.

Furthermore, a molar ratio ([C+T]/A) of a sum of the dihydric alcohol (C) and the trihydric or higher hydric alcohol (T) to the polymer polyol (A) is preferably 0.4 to 3.0, more preferably 0.6 to 2.0, and still more preferably 1.0 to 2.0. When the molar ratio ([C+T]/A) is the lower limit value or more, the amount of the hard segment in the polyurethane urea is moderately increased, and the performances, such as matting properties, are readily improved. In addition, when the molar ratio ([C+T]/A) is the aforementioned upper limit value or less, the amount of the soft segment in the polyurethane urea is appropriately controlled, whereby the performances, such as soft feel properties, scratch resistance, and coating appearance of the coating film, and storage stability of the paint, are readily made favorable.

A molar ratio (T/C) of the trihydric or higher hydric alcohol (T) to the dihydric alcohol (C) is preferably 0.01 to 2.0, more preferably 0.01 to 1.5, and still more preferably 0.02 to 1.0. When the molar ratio (T/C) is the lower limit value or more, a lowering of matting properties to be caused owing to heat can be prevented from occurring. In addition, when the molar ratio (T/C) is the upper limit value or less, the occurrence of gelation during synthesis can be prevented.

The NCO group-containing urethane prepolymer is preferably one obtained by reacting the polyol component and the polyisocyanate (D) in a ratio (NCO/active hydrogen) of the NCO group of the polyisocyanate (D) to the active hydrogen of the polyol component of 1.1 to 5.

The ratio (NCO/active hydrogen) is more preferably 1.2 to 1.8. When the ratio (NCO/active hydrogen) is the aforementioned lower limit value or more, it is possible to provide the molecular ends of the NCO group-containing urethane prepolymer with an NCO group. In addition, when the ratio (NCO/active hydrogen) is the aforementioned upper limit value or less, it is possible to prevent the unreacted polyisocyanate (D) from being left in the reaction system more than necessary.

As mentioned above, the active hydrogen of the compound (B) is preferably the hydrogen atom of the hydroxy group, and therefore, in the preferred embodiment, the ratio (NCO/active hydrogen) expresses a ratio (NCO/OH) of the NCO group of the polyisocyanate (D) to the hydroxy group of the polyol component.

It is preferred to react the NCO group-containing urethane prepolymer and the polyamine (E) in a ratio (NH/NCO) of a sum of the primary amino group and the secondary amino group of the polyamine (E) to the NCO group of the NCO group-containing urethane prepolymer of 0.3 to 2.1. The ratio (NH/NCO) is more preferably 0.6 or more and less than 1.0. In the case where the polyamine amount is low, for example, in the case where the ratio (NH/NCO) is less than 1, it is possible to perform water extension, and it becomes easy to set the amount of the crosslinked moiety to a moderate amount.

An average particle diameter of the polyurethane urea water dispersion of the present invention is preferably 0.03 to 15 μm, and more preferably 0.05 to 10 μm. By allowing the average particle diameter to fall within the aforementioned range, it is possible to impart excellent matting properties to the matte coating agent containing the polyurethane urea water dispersion of the present invention.

In the present invention, the average particle diameter means a median diameter (D50) measured with "MICROTRAC UPA-EX150", manufactured by Nikkiso Co., Ltd.

An acid value of the polyurethane urea water dispersion of the present invention is 1 to 16 mgKOH/g, preferably 2 to 15 mgKOH/g, and more preferably 2 to 10 mgKOH/g, as expressed in terms of a solid component. By allowing the acid value to fall within the aforementioned range, in addition to the effects as mentioned already, it is possible to control the particle diameter of the polyurethane urea water dispersion within the aforementioned range. In addition, by regulating the acid value to the upper limit value or less, the amount of the neutralizing agent is decreased, and therefore, the water resistance is improved.

The acid value of the polyurethane urea water dispersion is an acid value before the hydrophilic group of the compound (B) is neutralized with the neutralizing agent or the like, and it can be calculated as a calculated value from the blending amount of the compound (B) or the like. In addition, in the obtained polyurethane urea, it is also possible to calculate the acid value by identifying the amount of the hydrophilic group, such as a carboxy group. In the present invention, the acid value is calculated as a calculated value from the blending amount of the compound (B) or the like.

Although the solid component concentration of the polyurethane urea water dispersion of the present invention is not particularly limited, it is 5 to 50% by mass, and preferably 15 to 40% by mass.

It is possible to disperse the polyurethane urea water dispersion of the present invention in water even without using a surfactant. For that reason, in view of the fact that a surfactant is not used, the water resistance and the chemical resistance of the coating film are improved, and furthermore, a problem that the surfactant bleeds out from the coating film is not generated.

However, the surfactant may be used within a range where the effects of the present invention are not affected. Examples of the surfactant which may be used include a nonionic surfactant and an anionic surfactant.

The addition amount of the surfactant is preferably the addition amount falling within a range where the adhesiveness and the water resistance of the ultimately obtained polyurethane urea relative to respective base materials are not adversely affected. The addition amount of the surfactant is, for example, 15 parts by mass or less, preferably 10 parts by mass or less, more preferably 5 parts by mass or less, and still more preferably 2 parts by mass or less based on 100 parts by mass of the solid component of the polyurethane urea.

[Production Method of Polyurethane Urea Water Dispersion]

The polyurethane urea water dispersion of the present invention can be obtained by a known production method.

For example, first of all, the polymer polyol (A), the polysiloxane compound (S), the compound (B), the dihydric alcohol (C), and the trihydric or higher hydric alcohol (T) to be mixed as needed and the polyisocyanate (D) are reacted with each other at 20 to 150° C., and preferably 60 to 110° C. in the presence of an organic solvent not containing active hydrogen in a molecule thereof or in the absence of an organic solvent until the reaction product reaches, for example, a theoretical NCO %, to obtain the NCO group-containing urethane prepolymer.

Subsequently, after the obtained NCO group-containing urethane prepolymer is emulsified with water and the neutralizing agent, the polyamine (E) and optionally the diamine are added, the NCO group-containing urethane prepolymer is crosslinked and chain-extended with the polyamine (E) and the diamine and optionally water, to prepare the polyurethane urea. Thereafter, by performing desolvation as needed, the polyurethane urea water dispersion of the present invention can be obtained.

In the synthesis of the polyurethane urea, a catalyst can be used as needed. Examples of the catalyst include salts of a metal and an organic or inorganic acid, such as dibutyltin laurate, dioctyltin laurate, stannous octoate, lead octylate, and tetra-n-butyl titanate; organic metal derivatives; organic amines, such as triethylamine; and diazabicycloundecene-based catalysts.

In the case of using an organic solvent for the production method of the polyurethane urea water dispersion, examples of the organic solvent which is preferred include those which are inactive to the isocyanate group, or are less active than the reaction components. Examples thereof include ketone-based solvents, such as acetone, methyl ethyl ketone, methyl isobutyl ketone, and cyclohexanone; aromatic hydrocarbon solvents, such as toluene, xylene, SWASOL (a trade name, manufactured by Cosmo Oil Co., Ltd.), and SOLVESSO (a trade name, manufactured by Exxon Chemical Company); aliphatic hydrocarbon solvents, such as n-hexane; ether-based solvents, such as dioxane and tetrahydrofuran; ester-based solvents, such as ethyl acetate, butyl acetate, and isobutyl acetate; glycol ether ester-based solvents, such as ethylene glycol ethyl ether acetate, propylene glycol methyl ether acetate, 3-methyl-3-methoxybutyl acetate, and ethyl-3-ethoxypropionate; amide-based solvents, such as dimethylformamide and dimethylacetamide; and lactam-based solvents, such as N-methyl-2-pyrrolidone.

Of these, for example, methyl ethyl ketone, ethyl acetate, acetone, and tetrahydrofuran are more preferred taking into consideration solvent recovery, solubility at the time of urethane synthesis, reactivity, boiling point, and emulsification dispersibility in water.

After synthesis of the polyurethane urea, in the case where the isocyanate group remains at the polymer ends, a termination reaction of the isocyanate ends may be performed by adding a reaction terminator thereto.

Examples of the reaction terminator include monofunctional compounds, such as a monoalcohol and a monoamine; and compounds having two kinds of functional groups having different reactivity with the isocyanate from each other. Specifically, examples thereof include monoalcohols, such as methyl alcohol, ethyl alcohol, n-propyl alcohol, isopropyl alcohol, n-butyl alcohol, isobutyl alcohol, and tert-butyl alcohol; monoamines, such as monoethylamine, n-propylamine, diethylamine, di-n-propylamine, and cli-n-butylamine; and alkanolamines, such as monoethanolamine and diethanolamine. Of these, alkanolamines are preferred from the standpoint that the reaction is readily controlled.

[Matte Coating Agent]

The matte coating agent of the present invention is one containing the aforementioned polyurethane urea water dispersion. In addition, the matte coating agent is one using water as a dispersion medium. The matte coating agent of the present invention may be one in which the solid component is composed of the polyurethane urea water dispersion, but it may also contain, in addition to the polyurethane urea water dispersion, other resin than the polyurethane urea water dispersion and various additives. In addition, as for the matte coating agent, the polyurethane urea water dispersion and other components may be dispersed in water using, for example, a disper and a paint shaker.

As for the additive, one or more selected from, for example, an antioxidant, a light stabilizer, an ultraviolet absorber, a gas discoloration stabilizer, a metal deactivator, a coloring agent, an antifungal agent, a flame retarder, and a matting agent, can be appropriately used.

Specific examples of the antioxidant include various antioxidants, such as a hindered phenol-based antioxidant, a phosphite-based antioxidant, and a thioether-based antioxidant. Specific examples of the light stabilizer include a hindered ammine-based light stabilizer. Specific examples of the ultraviolet absorber include various ultraviolet absorbers, such as a benzophenone-based ultraviolet absorber and a benzotriazole-based ultraviolet absorber. Specific examples of the gas discoloration stabilizer include a hydrazine-based gas discoloration stabilizer. In addition, as for the coloring agent, known pigments and dyes may be used.

As for the matting agent, any of organic fine particles and inorganic fine particles may be used, and specifically, examples thereof include silica, silicon resin fine particles, fluorine resin fine particles, acrylic resin fine particles, urethane-based resin fine particles, silicone-modified urethane-based resin fine particles, polyethylene fine particles, and reactive siloxanes. In addition, in the case of using the matting agent, a dispersant for the purpose of dispersing the matting agent may be jointly used.

However, the matte coating agent of the present invention can provide high matting properties even without containing the matting agent, and the matting agent may be not used, or the matting agent may be contained within a range where the effects of the present invention are not affected. However, it is preferred that the matte coating agent of the present invention does not contain the matting agent. Even in the case where the matting agent is contained in the matte coating agent, the content of the matting agent is 50 parts by mass or less, preferably 30 parts by mass or less, and more preferably 10 parts by mass or less based on 100 parts by mass of the polyurethane urea water dispersion (on the basis of the solid component).

When the matte coating agent does not contain the matting agent, or when the matte coating agent contains the matting agent, but the content of the matting agent is low as mentioned above, bleeding of the matting agent onto the coating film is prevented from occurring. Furthermore, peeling of the coating film to be caused owing to friction is prevented from occurring, and the scratch resistance and so on become more excellent.

The matte coating agent of the present invention has high matting properties even when the content of the matting agent is low, or the matting agent is not contained, as mentioned above. The gloss (glossiness) of the coating film formed of the matte coating agent is preferably low in order to enhance the matting properties, and specifically, it is preferably 5 or less, and more preferably 2.5 or less. In addition, for example, in the case of using the matte coating agent for automobile interior members, the gloss is still more preferably 1.2 or less. Although a lower limit value of the gloss is not particularly limited, it is preferably 0.1 or more from the practical viewpoint. The gloss means 60° gloss and is one measured by the measurement method in the section of Examples as mentioned later.

The base material on which the matte coating agent of the present invention is applied is not particularly limited, and examples thereof include plastics, ceramic-based materials, concretes, and metals.

Examples of the plastic serving as the base material include conventionally known various plastics, such as an olefinic resin, e.g., a polyethylene-based resin and a polypropylene-based resin, an ethylene propylene diene-based resin, a styrene acrylonitrile-based resin, a polysulfone-based resin, a polyphenylene ether-based resin, an acrylic resin, a silicone-based resin, a fluorine-based resin, a polyester-based resin, a polyamide-based resin, a polyimide-based resin, a polystyrene-based resin, a polyurethane-based resin, a polycarbonate-based resin, a norbornene-based resin, a cellulose-based resin, a polyvinyl alcohol-based resin, a polyvinyl formal-based resin, a polyvinyl butyral-based resin, a polyvinylpyrrolidone-based resin, a polyvinyl acetal-based resin, a polyvinyl acetate-based resin, a polyolefin-based thermoplastic elastomer (TPO), a vinyl chloride resin, an engineering plastic, and a biodegradable plastic.

The plastic may also be a plastic molded article or the like, and in particular, plastic molded articles which are used as an automobile interior member, such as a polyolefin resin, TPO, polyurethane, and polypropylene, are preferably exemplified. In addition, in the case of a TPO base material sheet, a molded article, such as an automobile instrument panel, can be produced by coating a two-pack type aqueous urethane-based resin on a corona discharge-treated TPO base material sheet and further coating the matte coating agent of the present invention thereon by means of spray coating or gravure coating, followed by subjecting to vacuum molding.

A method in which the paint of the present invention is coated directly on the plastic molded article; a mold molding method in which the paint of the present invention is spray-coated on a die, and polypropylene, a urethane-based resin, or the like is then put into the die; and the like are also useful. However, in the case of applying the paint of the present invention on a polypropylene molded article with poor adhesiveness, it is preferred to subject the surface of the plastic molded article to a primer treatment in advance.

Although the matte coating agent of the present invention is not particularly limited, a coating film composed of the matte coating agent can be provided by applying it onto a base material of every sort such that the solid component thickness is, for example, 3 to 25 μm, and then drying at, for example, 90 to 120° C. for 1 to 3 minutes.

[Surface Treatment Agent]

The surface treatment agent of the present invention is one containing the aforementioned polyurethane urea water dispersion. For example, a skin material can be provided by forming a film composed of the surface treatment agent of the present invention on the base material. Here, the "film" as referred to in this specification means a film obtained by drying an undried "coating film" resulting from applying the surface treatment agent.

Examples of the base material include films and synthetic leathers using the following resins. In addition, the base material may also be a foam base material.

Examples of the resin include a polyvinyl chloride resin, an olefinic resin, such as a polyethylene-based resin, a polypropylene-based resin, and a thermoplastic polyolefin, an ethylene propylene diene-based resin, a styrene acrylonitrile-based resin, a polysulfone-based resin, a polyphenylene ether-based resin, an acrylic resin, a silicone-based resin, a fluorine-based resin, a polyester-based resin, a polyamide-based resin, a polyimide-based resin, a polystyrene-based resin, a polyurethane-based resin, a polycarbonate-based resin, a norbornene-based resin, a cellulose-based resin, a polyvinyl alcohol-based resin, a polyvinyl formal-based resin, a polyvinyl butyral-based resin, a polyvinylpyrrolidone-based resin, a polyvinyl acetal-based resin, a polyvinyl acetate-based resin, an engineering plastic, and a biodegradable plastic.

In particular, examples of the resin for automobile interior member include a polyvinyl chloride resin, a thermoplastic polyolefin, polyurethane, and polypropylene.

In the case where the base material is a foam base material, a base material, such as a vinyl chloride resin, can be used.

The thickness of the base material is preferably 0.2 to 0.8 mm, and in the case where the base material is a foam base material which is to be expanded, the thickness after expansion is preferably 0.3 to 4.5 mm.

The skin material is, for example, produced by applying the aqueous surface treatment agent of the present invention on the base material and drying at 80 to 140° C. and optionally crosslinking, to form a film.

Here, as for the process in which heat is applied, in addition to drying after applying, heat of about 200° C. is temporarily applied even in an embossing processing for imparting designability or the like. However, in the conventional case, the matting properties are occasionally lowered. But, in the surface treatment agent of the present invention, on the occasion of preparing the polyurethane urea water dispersion of the present invention, by containing the trihydric or higher hydric alcohol (T), the favorable matting properties can be maintained even when the heat of about 200° C. is applied.

In the case of applying the surface treatment agent of the present invention on a thermoplastic resin base material with poor adhesiveness, in order to enhance the adhesion to the paint, a primer treatment may be performed.

The film thickness of the thus formed film is preferably 2 to 30 μm.

To the surface treatment agent of the present invention, a slip agent, a pigment, a silane coupling agent, a coloring agent, an antifungal agent, a flame retardant, a leveling agent, a thickener, a defoaming agent, an antioxidant, a light stabilizer, an ultraviolet absorber, various surfactants, a wetting agent, a dispersant, a film forming aid, a plasticizer, an antiseptic, a mildew-proofing agent, an alga-proofing agent, a sterilizer, an antistatic agent, and so on can be added within a range the effects of the present invention are not affected.

EXAMPLES

The present invention is hereunder specifically described by reference to Examples and Comparative Examples, but it should be construed that the present invention is not limited to these Examples. In addition, in the following description, the terms "parts" and "%" are parts by mass and mass %, respectively.

[Polyurethane Urea Water Dispersion]

Example 1

After a reaction vessel equipped with a stirrer, a reflex condenser, a thermometer, and a nitrogen blowing tube was purged with a nitrogen gas, 100 parts of polycarbonate diol (a registered trademark: "PLACCEL CD220", manufactured by Daicel Corporation, number average molecular weight: 2,000), 2.4 parts of dimethylolpropionic acid, 4.7 parts of 1,4-butanediol, 20 parts of a polysiloxane compound, and 23 parts of acetone were added and uniformly dissolved.

As for the polysiloxane compound, "KF6001", manufactured by Shin-Etsu Silicone Co., Ltd. (a silicone oil having a hydroxy group bonded to the both sides of the siloxane skeleton as the main chain (OH value=62)) was used.

Subsequently, 36 parts of 1,6-hexamethylene diisocyanate was added to perform the reaction at 80° C., and the reaction was performed until the NCO concentration reached 2.4%, to obtain an NCO group-containing urethane prepolymer. Thereafter, the resultant was cooled to 50° C.; 390 parts of ion-exchanged water and 2.2 parts of triethylamine as a neutralizing agent were added; the inside of the system was uniformly emulsified; and 3.4 parts of diethylenetriamine was charged, to achieve chain extension. Finally, the acetone within the system was recovered through vacuum deaeration, to obtain a polyurethane urea water dispersion having a solid component concentration of 30%, an average particle diameter of 3 μm, and an acid value (expressed in terms of a solid component) of 7 mgKOH/g. The average particle diameter and the acid value (expressed in terms of a solid component) of the resulting polyurethane urea water dispersion are shown in Table 1. In addition, this polyurethane urea water dispersion was used as a matte coating agent and subjected to various tests.

Examples 2 to 14 and Comparative Examples 1 to 5

Polyurethane urea water dispersions were obtained in the same manner as in Example 1, except for changing the blend of the respective components to those shown in Table 1. In Examples 13 to 14, "KF6003", manufactured by Shin-Etsu Silicone Co., Ltd. (a silicone oil having a hydroxy group bonded to the both sides of the siloxane skeleton as the main chain (OH value=22)) was used as the polysiloxane compound in place of the KF6001. The average particle diameter and the acid value (expressed in terms of a solid component) of each of the resulting polyurethane urea water dispersions are shown in Table 1. In addition, these polyurethane urea water dispersions were each used as a matte coating agent and subjected to the various tests.

[Preparation of Test Sheet]

The matte coating agent obtained in each of the Examples and Comparative Examples was applied onto a Leneta chart sheet (manufactured by Leneta Company) by using a bar coater and dried with a dryer at 120° C. for 1 minute, to prepare a test sheet having a coating film thickness of 5 μm.

<Gloss>

Using a direct reading haze computer, HGM-2DP (manufactured by Suga Test Instruments Co., Ltd.), the gloss [(60° incident light)/(60° reflected light)] of the coating film surface of the test sheet was measured.

<Gloss after Heating (at 120° C. and 200° C.)>

The gloss of the coating film surface after heating the test sheet at 120° C. for 5 minutes was measured in the same manner as that mentioned above.

In addition, the gloss of the coating film surface after heating the test sheet at 200° C. for 5 minutes was measured in the same manner as that mentioned above.

<Scratch Resistance>

The coating film surface of the test sheet was rubbed 100 times with Scotch-Brite (manufactured by Sumitomo 3M Limited) under a load of about 1 kg/$cm^2$, and the scratch on the surface was visually confirmed according to the following evaluation criteria.

A: The number of scratches capable of being confirmed is 0 or more and less than 5.

B: The number of scratches capable of being confirmed is 5 or more and less than 10.

C: The number of scratches capable of being confirmed is 10 or more.

<Storage Stability>

After allowing the matte coating agent to stand at room temperature (23° C.) for one month, the degree of precipitation or the degree of coagulation was visually judged according to the following evaluation criteria.

A: The precipitate is not produced, or it is possible to easily fractionate the precipitate.

B: A part of the precipitate is solidified on the bottom, and it is difficult to redisperse the precipitate.

C: The entirety of the precipitate is solidified and not redispersed.

<Coating Appearance>

The coating film surface of the test sheet was visually observed, and the coating appearance was evaluated according to the following evaluation criteria.

A: Unevenness of coating is not observed.

B: A deposit is partly observed, and unevenness of coating is observed.

C: A lot of deposits are observed, and a coating film is not provided.

<Slipperiness>

The coating film surface of the test sheet was rubbed by a finger, and the slipperiness on that occasion was judged according to the following evaluation criteria.

A: No projection exists at all.

B: The projection slightly exists.

C: The projection exists.

<Soft Feel Properties>

The coating film surface of the test sheet was rubbed by a finger, and the soft feel properties were evaluated from the resulting texture according to the following evaluation criteria.

A: Elasticity was revealed, and a silk-like texture was provided.

B: Elasticity was not revealed, and a texture with a slight grip feel was provided.

C: A sticky texture was provided.

TABLE 1

| | | | Molecular | Example | | | | | | | | | |
|---|---|---|---|---|---|---|---|---|---|---|---|---|---|
| | | | weight | 1 | 2 | 3 | 4 | 5 | 6 | 7 | 8 | 9 | 10 |
| Blend (parts by mass) | (A) | Polycarbonate diol | 2000 | 100 | 100 | 100 | 100 | 100 | 100 | 100 | 100 | 100 | 100 |
| | (S) | Polysiloxane compound KF6001 | 1800 | 20 | 20 | 5 | 45 | 20 | 20 | 20 | 20 | 20 | 20 |
| | (S) | Polysiloxane compound KF6003 | 5110 | | | | | | | | | | |
| | (B) | Dimdethylolpropionic acid | 134.1 | 2.9 | 2.9 | 2.5 | 3.6 | 0.8 | 3.8 | 6.8 | 2.9 | 3.2 | 3.1 |
| | (C) | 1,4-Butanediol | 90.1 | 6.3 | 5.7 | 4.9 | 7.2 | 7.1 | 3.8 | 3.4 | 5.8 | 8.3 | |
| | (C) | 1,10-Decanediol | 190 | | | | | | | | | | 12.2 |
| | (T) | Trimethylolpropane | 134.2 | | 0.5 | 0.5 | 0.5 | 0.5 | 0.5 | 0.5 | 0.5 | 0.5 | 0.5 |
| | (D) | Hexamethylene diisocyanate | 168.2 | 86.0 | 35.4 | 30.5 | 44.1 | 35.4 | 30 | 35.4 | 36.0 | 42.9 | 36.3 |
| | (E) | Diethylenetriamine | 103.2 | 3.4 | 3.3 | 2.9 | 4.1 | 3.3 | 2.8 | 3.3 | 8.4 | 4 | 3.4 |
| | (E) | Triethylenetetramine | 146.3 | | | | | | | | | | |
| | | Ethylenediamine | 60.1 | | | | | | | | | | |
| Ratio | | NCO/OH | | 1.4 | 1.4 | 1.4 | 1.4 | 1.4 | 1.4 | 1.4 | 1.4 | 1.4 | 1.4 |
| | | NH/NCO of polyamine (E) | | 0.8 | 0.8 | 0.8 | 0.8 | 0.8 | 0.8 | 0.8 | 2.0 | 0.8 | 0.8 |
| | | B [DMPA/A [Polycarbol (molar ratio) | | 0.43 | 0.43 | 0.35 | 0.54 | 0.12 | 0.70 | 0.94 | 0.43 | 0.48 | 0.46 |
| | | C [1,4BD]/A [Polycarbo] (molar ratio) | | 1.4 | 1.3 | 1.1 | 1.6 | 1.6 | 1.0 | 0.8 | 1.3 | 1.8 | 1.3 |
| | | T [TMP]/C [1,4BD] (molar ratio) | | 0 | 0.07 | 0.07 | 0.05 | 0.07 | 0.07 | 0.10 | 0.06 | 0.04 | 0.06 |
| | | [C + T]/A (molar ratio) | | 1.4 | 1.4 | 1.2 | 1.7 | 1.7 | 1.1 | 0.8 | 1.4 | 1.9 | 1.4 |
| | | S [Siloxane]/A [Polycarbo] (weight ratio) | | 0.2 | 0.2 | 0.05 | 0.45 | 0.2 | 0.2 | 0.2 | 0.2 | 0.2 | 0.2 |
| Physical properties | | Average particle diameter (μm) | | 4.0 | 3.0 | 4.0 | 4.0 | 10 | 0.1 | 0.05 | 4.0 | 2.5 | 4.0 |
| | | Acid value (mgKOH/g) | | 7 | 7 | 7 | 7 | 2 | 11 | 15 | 7 | 7 | 7 |
| | | Gloss value | | 0.8 | 0.8 | 1.1 | 1.1 | 0.8 | 0.8 | 1.2 | 1.1 | 0.8 | 1.1 |
| | | Gloss after heating at 120° C. | | 1.9 | 1.2 | 2.1 | 1.4 | 1.2 | 1.2 | 1.9 | 1.8 | 1.2 | 1.5 |
| | | Gloss after heating at 200° C. | | 60 | 3.9 | 3.6 | 4.1 | 3.9 | 4.0 | 2.1 | 2.1 | 2.1 | 3.2 |
| | | Scratch resistance | | A | A | A | A | A | A | A | A | A | A |
| | | Soft feel properties | | A | A | A | A | A | A | A | A | A | A |
| | | Slipperiness | | A | A | B | A | A | A | A | A | A | A |
| | | Storage stability | | A | A | A | A | A | A | A | A | A | A |
| | | Coating appearance | | A | A | A | A | A | A | A | A | A | A |

| | | | Molecular | Example | | | | Comparative Example | | | | |
|---|---|---|---|---|---|---|---|---|---|---|---|---|
| | | | weight | 11 | 12 | 13 | 14 | 1 | 2 | 3 | 4 | 5 |
| Blend (parts by mass) | (A) | Polycarbonate diol | 2000 | 100 | 100 | 100 | 100 | 100 | 100 | 100 | 100 | 100 |
| | (S) | Polysiloxane compound KF6001 | 1800 | 20 | 20 | | | 20 | 20 | | 20 | 20 |
| | (S) | Polysiloxane compound KF6003 | 5110 | | | 20 | 45 | | | | | |
| | (B) | Dimdethylolpropionic acid | 134.1 | 2.9 | 3 | 2.8 | 3.3 | 2.9 | 2.9 | 2.4 | 7.4 | 2.5 |
| | (C) | 1,4-Butanediol | 90.1 | 5.8 | 3 | 4.9 | 5.2 | 6.3 | 5.8 | 4.6 | 2.7 | |
| | (C) | 1,10-Decanediol | 190 | | | | | | | | | |
| | (T) | Trimethylolpropane | 134.2 | 0.5 | 0.5 | 0.5 | 0.5 | | 0.5 | 0.5 | 0.5 | 0.5 |
| | (D) | Hexamethylene diisocyanate | 168.2 | 36.0 | 30.0 | 33.0 | 33 | 36.0 | 36.0 | 29.4 | 36.0 | 20.1 |
| | (E) | Diethylenetriamine | 103.2 | | 1.6 | 3 | 3.2 | | | 2.8 | 3.4 | 1.9 |
| | (E) | Triethylenetetramine | 146.3 | 3.5 | | | | | | | | |
| | | Ethylenediamine | 60.1 | | 1.3 | | | 2.9 | 2.9 | | | |
| Ratio | | NCO/OH | | 1.4 | 1.5 | 1.4 | 1.4 | 1.4 | 1.4 | 1.4 | 1.4 | 1.4 |
| | | NH/NCO of polyamine (E) | | 0.8 | 0.4 | 0.8 | 0.8 | 0 | 0 | 0.8 | 0.8 | 0.8 |
| | | B [DMPA/A [Polycarbol (molar ratio) | | 0.43 | 0.45 | 0.42 | 0.42 | 0.43 | 0.43 | 0.36 | 1.11 | 0.37 |
| | | C [1,4BD]/A [Polycarbo] (molar ratio) | | 1.3 | 0.7 | 1.1 | 1.2 | 1.4 | 1.3 | 1.0 | 0.6 | 0 |
| | | T [TMP]/C [1,4BD] (molar ratio) | | 0.06 | 0.11 | 0.07 | 0.06 | 0 | 0.06 | 0.07 | 0.07 | — |
| | | [C + T]/A (molar ratio) | | 1.4 | 0.7 | 1.2 | 1.2 | 1.4 | 1.4 | 1.1 | 0.7 | 0.1 |
| | | S [Siloxane]/A [Polycarbo] (weight ratio) | | 0.2 | 0.2 | 0.2 | 0.45 | 0.2 | 0.2 | 0 | 0.2 | 0.2 |

TABLE 1-continued

| | | | | | | | | | | |
|---|---|---|---|---|---|---|---|---|---|---|
| Physical properties | Average particle diameter (μm) | 3.0 | 3.0 | 3.5 | 4.0 | 0.01 | 16 | 3.0 | 0.01 | 30 |
| | Acid value (mgKOH/g) | 7 | 7 | 7 | 7 | 7 | 7 | 7 | 18 | 7 |
| | Gloss value | 0.8 | 0.9 | 1.0 | 1.1 | 50 | 10 | 0.8 | 50 | 30 |
| | Gloss after heating at 120° C. | 1.2 | 1.2 | 1.3 | 2.1 | 60 | 60 | 1.2 | 60 | 60 |
| | Gloss after heating at 200° C. | 1.3 | 2.5 | 3.3 | 3.6 | 60 | 60 | 10 | 60 | 60 |
| | Scratch resistance | A | A | A | A | A | C | A | A | C |
| | Soft feel properties | A | A | A | A | A | B | A | A | B |
| | Slipperiness | A | A | A | A | A | A | C | A | A |
| | Storage stability | A | A | A | A | A | A | A | A | A |
| | Coating appearance | A | A | A | A | A | A | A | A | A |

As shown in Table 1, in the matte coating agent of each of the Examples, by using the reaction product of the components (A) to (E) as the polyurethane urea water dispersion, the matting properties, the heat resistance, the scratch resistance, the storage stability, the coating appearance, the slipperiness, and the soft feel properties could be made favorable.

Examples according to a synthetic leather are hereunder described.

Using a solvent-type skin agent and a solvent-type adhesive composed of the following prepared liquids, respectively, which have hitherto been used for producing a synthetic leather, a skin layer and an adhesive layer were formed under the following condition and then laminated on a base material (textile) as shown below, to produce a synthetic leather.

Under the following preparation condition of a synthetic leather, a coating film was formed under the aforementioned condition to provide the skin layer and the adhesive layer. After ripening, the resultant was peeled off from a release paper, to produce a synthetic leather.

<Skin Layer>

(Prepared Liquid)

RESAMINE ME-8106 (manufactured by Dainichiseika Color & Chemicals Mfg. Co., Ltd., a product containing 70% of solvent): 100 parts DMF: 33 parts (Release paper) AR-99SG (Application amount) 250 μm/wet (Drying condition) 100° C./2 min→120° C./3 min (Film thickness) About 50 μm <Adhesive Layer>

(Prepared Liquid)

RESAMINE UD-750SA (manufactured by Dainichiseika Color & Chemicals Mfg. Co., Ltd., a product containing 25% of solvent): 100 parts RESAMINE UD-Crosslinking Agent (manufactured by Dainichiseika Color & Chemicals Mfg. Co., Ltd., a product containing 25% of solvent): 15 parts RESAMINE UD-102 Accelerator (manufactured by Dainichiseika Color & Chemicals Mfg. Co., Ltd., a product containing 98% of solvent): 10 parts DMF: 20 parts MEK: 20 parts (Application amount) 100 μm/wet (Pre-drying condition) 80° C./2 min (Film thickness) About 50 μm (Lamination on base material) Pressure bonded to the textile at a temperature 40° C./0 μm with a laminate roll (Ripening) 50° C.×48 hours The matte coating agent (polyurethane urea water dispersion) obtained in each of Examples 1 and 2 and Comparative Examples 1 and 2 described in Table 1 was applied as the surface treatment agent on the synthetic leather as prepared above by using a bar coater and then dried with a dryer at 120° C. for 1 minute, to form a coating film having a thickness of 5 μm. The resultant was further subjected to heat emboss processing at 160 to 190° C., to prepare a synthetic leather.

The prepared synthetic leathers were evaluated with respect to the following soft feel properties, matting properties, and slipperiness. The results are shown in the following Table 2.

TABLE 2

| | Example | | Comparative Example | |
|---|---|---|---|---|
| Evaluation results | 1 | 2 | 1 | 3 |
| Soft feel properties | A | A | A | B |
| Matting properties | A | A | C | C |
| Slipperiness | A | A | A | C |

<Soft Feel Properties>

The coating film surface of the synthetic leather was rubbed by a finger, and the soft feel properties were evaluated from the resulting texture according to the following evaluation criteria.

A: Elasticity was revealed, and a silk-like texture was provided.

B: Elasticity was not revealed, and a texture with a slight grip feel was provided.

C: A sticky texture was provided.

<Matting Properties>

The appearance of the synthetic leather was visually evaluated according to the following criteria.

A: The glossy feel is not observed.

B: The glossy feel is slightly observed.

C: The glossy feel is observed.

<Slipperiness>

The coating film surface of the synthetic leather was rubbed by a finger, and the slipperiness on that occasion was judged according to the following evaluation criteria.

A: No projection exists at all.

B: The projection slightly exists.

C: The projection exists.

From the foregoing results, the synthetic leathers obtained in Examples 1 and 2 had excellent soft feel properties, matting properties, and slipperiness.

INDUSTRIAL APPLICABILITY

The polyurethane urea water dispersion, the matte coating agent, and the surface treatment agent according to the present invention are favorable in matting properties, heat resistance, scratch resistance, storage stability, coating appearance, slipperiness, and soft feel properties and can be used as a designability imparting paint for building exteriors, building interiors, vehicle interiors, and so on.

The invention claimed is:

1. A polyurethane urea water dispersion that is a reaction product of:

a polyol component comprising a polymer polyol (A), a polysiloxane compound(S) comprising an active hydrogen-comprising group, a compound (B) comprising an active hydrogen and a hydrophilic group in a molecule thereof, and a dihydric alcohol (C);

a polyisocyanate (D); and a polyamine (E) comprising a first primary amino group, a second primary amino group, and a secondary amino group, wherein the polyurethane urea water dispersion has an acid value in a range of from 1 to less than 10 mgKOH/g, expressed in terms of a solid component, and an average particle diameter of the polyurethane urea water dispersion is in a range of from 2.5 to 15 μm, wherein the polymer polyol (A) comprises a polyether polyol, a polyester polyol, a polycarbonate polyol, a polyolefin polyol, and/or a polymethacrylate polyol, wherein the compound (B) comprises dimethylolpropionic acid, dimethylolbutanoic acid, lactic acid, and glycine, and/or a sulfonic acid compound, wherein the polysiloxane compound(S) comprises (1) an amino-modified polysiloxane, (2) an epoxy-modified polysiloxane, (3) an alcohol-modified polysiloxane, and/or (4) a mercapto-modified polysiloxane, as follows:

(1a)

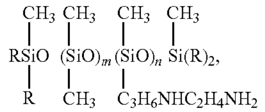

m being in a range of from 1 to 10, n being in a range of from 2 to 10, R being $CH_3$ or $OCH_3$;

(1b)

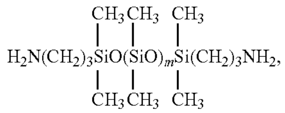

m being in a range of from 0 to 200;

(1c)

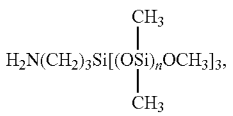

n being in a range of from 2 to 10;

(1d)

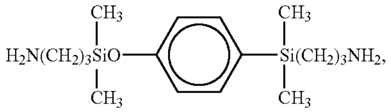

-continued (1e)

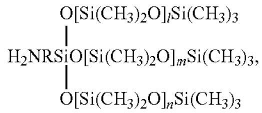

a branching point being in a range of from 2 to 3, R being lower alkyl group, 1 being in a range of from 2 to 200, m being in a range of from 2 to 200, and n being in a range of from 2 to 200;

(1f)

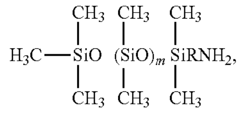

m being in a range of from 1 to 200 and R being lower alkyl group;

(2a)

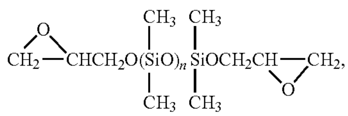

n being in a range of from 1 to 200;

(2b)

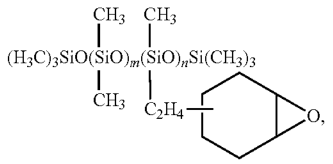

m being in a range of from 1 to 10 and n being in a range of from 2 to 10;

(2c)

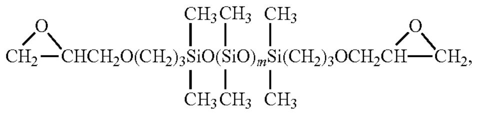

m being in a range of from 1 to 200;

(2d)

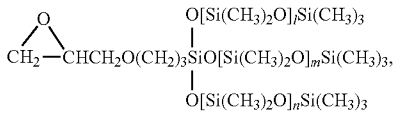

a branching point being in a range of from 2 to 3, 1 being in a range of from 2 to 200, m being in a range of from 2 to 200, and n being in a range of from 2 to 200;

(2e)

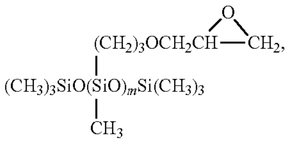

m being in a range of from 1 to 10;

(2f)

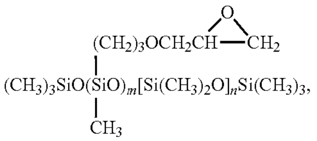

m being in a range of from 1 to 10 and n being in a range of from 2 to 10;

(3a)

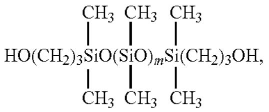

m being in a range of from 1 to 300;

(3b)

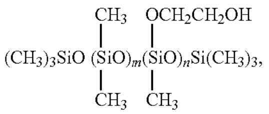

m being in a range of from 1 to 300, and n being in a range of from 2 to 50;

(3c)

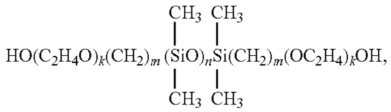

k being in a range of from 1 to 200, m being in a range of from 2 to 6, and n being in a range of from 1 to 400;

(3d)

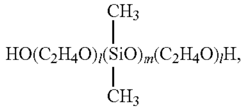

being in a range of from 1 to 200 and m being in a range of from 1 to 200;

(3e)

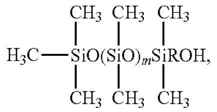

m being in a range of from 1 to 400 and R being lower alkyl group;

(3f)

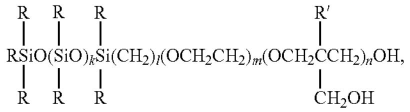

R being $CH_3$ or $OCH_3$, R' being a hydrogen atom or alkyl group, k being in a range of from 1 to 250, 1 being in a range of from 0 to 5, m being in a range of from 0 to 50, and n being in a range of from 1 to 3;

(3g)

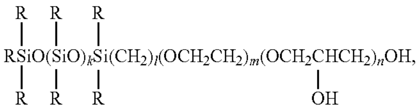

R being $CH_3$ or $OCH_3$, k being in a range of from 1 to 250, 1 being in a range of from 0 to 5, m being in a range of from 0 to 50, and n being in a range of from 1 to 3;

(4a)

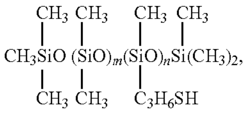

m being in a range of from 1 to 20 , and n being in a range of from 2 to 100;

(4b)

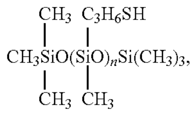

wherein n being in a range of from 2 to 100;

(4c)

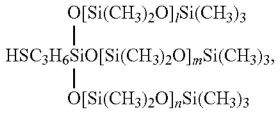

a branching point being in a range of from 2 to 3, 1 being in a range of from 2 to 200, m being in a range of from 2 to 200, and n being in a range of from 2 to 200; and

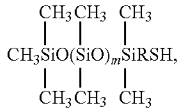

(4d)

m being in a range of from 1 to 300, and R being lower alkyl group, wherein the polymer polyol (A), the polysiloxane compound(S), the compound (B), the dihydric alcohol (C), the polyisocyanate (D), and the polyamine (E) are each distinct compounds, and wherein the dihydric alcohol (C) provides a hard segment in the polyurethane and the polymer polyol (A) provides a soft segment in the polyurethane.

2. The dispersion of claim 1, which is a reaction product obtained by further reacting an NCO group comprising urethane prepolymer comprising a reaction product of the polyol component and a polyisocyanate (D), with a polyamine (E).

3. The dispersion of claim 2, wherein the NCO group comprising urethane prepolymer is a reaction product obtained by reacting the polyol component and the polyisocyanate (D) in an (NCO)/active hydrogen ratio of the NCO group of the polyisocyanate (D) to the active hydrogen of the polyol component in a range of from 1.1 to 5, and wherein the NCO group-containing urethane prepolymer is reacted with the polyamine (E) in an (NH)/(NCO) ratio of a sum of the primary amino group and the secondary amino group of the polyamine (E) to the NCO group of the NCO group comprising urethane prepolymer in a range of from 0.3 to 2.1.

4. The dispersion of claim 1, wherein an (S)/(A) mass ratio of the polysiloxane compound (S) having at least one active hydrogen-containing group to the polymer polyol (A) is in a range of from 0.01 to 30.

5. The dispersion of claim 1, wherein a (B)/(A) molar ratio (B/A) of of the compound (B) to the polymer polyol (A) is in a range of from 0.05 to 0.9, and wherein a (C)/(A) molar ratio of the dihydric alcohol (C) to the polymer polyol (A) is in a range of from 0.4 to 2.

6. The dispersion of claim 1, wherein the polyol component further comprises a trihydric or higher hydric alcohol (T), distinct from the polymer polyol (A), the polysiloxane compound(S), the compound (B). and the dihydric alcohol (C).

7. The dispersion of claim 6, wherein a (C+T)/(A) molar ratio of a sum of the dihydric alcohol (C) and the trihydric or higher hydric alcohol (T) to the polymer polyol (A) is in a range of from 0.4 to 3.0.

8. The dispersion of claim 6, wherein a (C+T)/(A) molar ratio of a sum of the dihydric alcohol (C) and the trihydric or higher hydric alcohol (T) to the polymer polyol (A) is in a range of from 0.6 to 2.0.

9. The dispersion of claim 6, wherein a (T)/(C) molar ratio of the trihydric or higher hydric alcohol (T) to the dihydric alcohol (C) is in a range of from 0.01 to 2.0.

10. The dispersion of claim 1, having an average particle diameter in a range of from 2.5 to 10 μm.

11. The dispersion of claim 1, wherein the dihydric alcohol (C) has a number average molecular weight of less than 500, wherein the polymer polyol (A) has a number average molecular weight of 500 or more, and wherein polyurethane urea water dispersion further comprises a trihydric or higher alcohol (T), distinct from the polymer polyol (A), the polysiloxane compound(S), the compound (B), and the dihydric alcohol (C), having a number average molecular weight of 92 to 300.

12. The dispersion of claim 1, wherein the polyamine (E) comprises diethylenetriamine, dipropylenetriamine, triethylenetetramine, tetraethylenepentamine, and/or 2-aminoethyl-3-aminopropylamine.

13. The polyurethane urea water dispersion according toof claim 1, wherein the polymer polyol (A) is a polycarbonate polyol.

14. A matte coating agent, comprising:

the polyurethane urea water dispersion of claim 1.

15. A surface treatment agent, comprising:

the polyurethane urea water dispersion of claim 1.

16. The dispersion of claim 1, wherein the polysiloxane compound(S) is (1) the amino-modified polysiloxane.

17. The dispersion of claim 1, wherein the polysiloxane compound(S) is (2) the epoxy-modified polysiloxane.

18. The dispersion of claim 1, wherein the polysiloxane compound(S) is (3) the alcohol-modified polysiloxane.

19. The dispersion of claim 1, wherein the polysiloxane compound(S) is (4) the mercapto-modified polysiloxane.

20. The dispersion of claim 1, having an acid value in a range of from 1 to 7 mgKOH/g, as expressed in terms of a solid component.

* * * * *